March 9, 1943. B. EDELMAN 2,313,525
ARTICLE FORMING APPARATUS
Filed Oct. 9, 1941 2 Sheets-Sheet 1
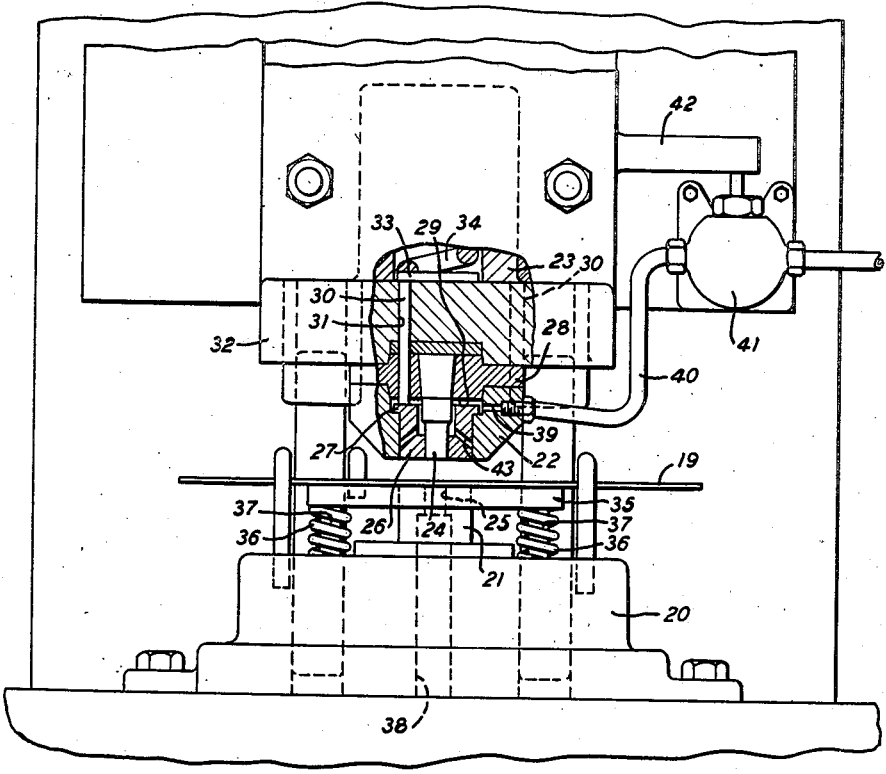
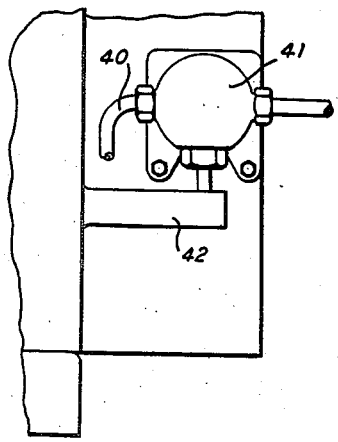
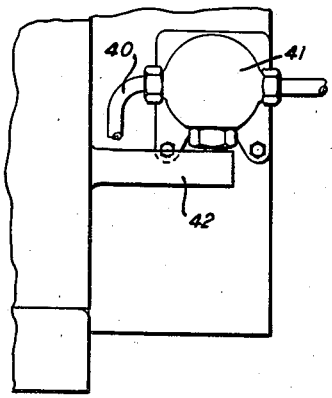
INVENTOR
BY B. EDELMAN
ATTORNEY March 9, 1943.     B. EDELMAN     2,313,525
ARTICLE FORMING APPARATUS
Filed Oct. 9, 1941     2 Sheets-Sheet 2
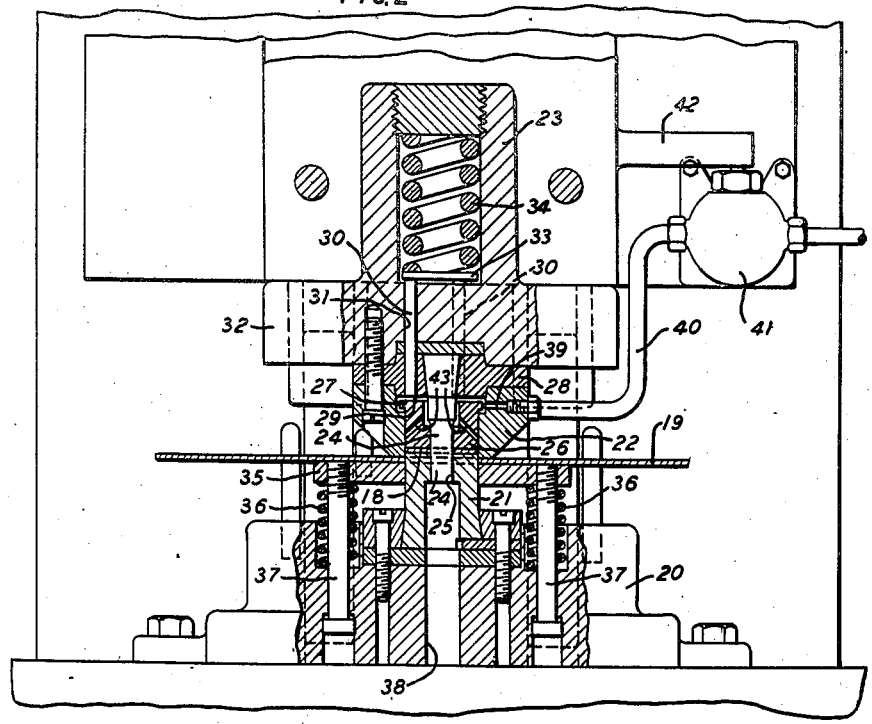
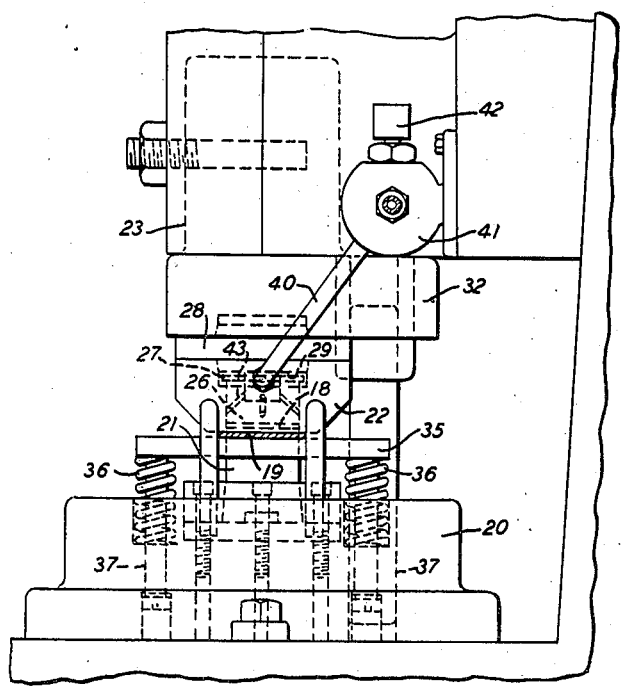
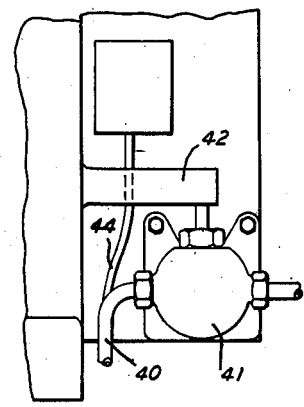
INVENTOR
B. EDELMAN
BY E. R. Nowlan
ATTORNEY Patented Mar. 9, 1943

2,313,525

UNITED STATES PATENT OFFICE 2,313,525

ARTICLE FORMING APPARATUS

Beril Edelman, Brooklyn, N. Y., assignor to Western Electric Company, Incorporated, New York, N. Y., a corporation of New York Application October 9, 1941, Serial No. 414,264

4 Claims. (Cl. 164—22)

This invention relates to article forming apparatus, and more particularly to punch and die article blanking machinery.

There are various forms of apparatus, particularly punch presses, in which blanks for articles to be formed, or, in some instances, completely formed articles are cut from ribbon, strip or sheet material by the coaction of a punch entering a die through the material and shearing out a piece of the material between the coacting edges of the punch and die. Stripper plates and knockout members may be associated with the two tools to release the punched article and the punched matrix from the tools. Hence there may be a complex plurality of interfitting and relatively telescopically slidable parts. When it is sought to deal with certain materials in such machines a more or less fine, sometimes almost impalpable powder is produced by the shearing action. Materials which may produce such dust are, for example, molded sheets of artificial resin, especially if incorporating a powdered filler of sawdust, mineral powder or the like, also other analogous mixtures of a binder (rubber, casein plastics, cellulose plastics, or the like) with or without a filler. In these cases it is often found that the powder or dust produced finds it way between the telescopically sliding parts of the machine, and may cause them to stick or even break. This is particularly troublesome perhaps when the powder is of a nature to become sticky under heat or pressure or both.

An object of the present invention is to provide article forming machinery having simple and reliable means to prevent the collection of dust in the crevices between telescopically interfitting, relatively movable tools and to effect the removal of such dust if present.

In one embodiment, the invention may be illustrated in a compound punch and die in a punch press, in which compressed air is introduced into a chamber in the die defined by the die and a spring pad therein, the air being forced out, either by its own pressure or by the piston effect of the pad sliding in the die, through the several crevices between the telescopically movable parts.

Other objects and features of the invention will appear from the following detailed description of one embodiment thereof in a combination blanking and perforating machine, taken in connection with the accompanying drawings in which the same reference numerals are applied to identical parts in the several figures and in which Fig. 1 is a front elevational view, partly in section, of the relevant parts of a punch press equipped and constructed in accordance with the invention and with the punch and die members retracted from each other;

Fig. 2 is a similar view with the punch and die members in engagement;

Fig. 3 is a view in side elevation of the showing of Fig. 2;

Fig. 4 is a partial view of a modified form;

Fig. 5 is a similar view thereof in another position; and

Fig. 6 is a similar view of another form.

In the disclosure herein described and illustrated, an ordinary punch press of familiar type is shown equipped and constructed to embody the invention. The machine generally being familiar, only so much of it is shown and described as is necessary to a clear understanding of the invention.

On a stationary bed 20 is rigidly mounted in any suitable fashion a punch 21 to coact with a die 22 rigidly mounted on the vertically reciprocable ram 23. Within the die is mounted, also rigidly on the ram, a perforator 24 to coact with a corresponding aperture 25 in the punch 21. An annular shedder 26 is positioned between the die and the perforator, telescopically slidable on both. The shedder is formed at its upper end with an integral stop collar 27 to limit its downward motion in the die. Its upward motion is limited by the perforator plate 28 in which the perforator is mounted and against which the die abuts. The shedder has a limited range of vertical travel between these limits with respect to the die and the perforator. The range of this travel is ordinarily a little more than the thickness of the sheet material 19 to be punched, so that, when the parts are in the position shown in Fig. 1, there is a small chamber 29 defined and walled in by the die, perforator and shedder and opened only by the fine crevices between the relatively slidable parts. The shedder 26 is held resiliently down in the position of Fig. 1 by push rods 30 passing up through appropriate close fitting bores 31 in the die bed 32. The rods 30 are abutted at their lower ends against the shedder 26 and at their upper ends against a movable annular abutment 33 which is pressed down by a compression spring 34.

A stripper plate 35 is mounted on the bed 20 and is telescopically vertically slidable on the punch 21, being yieldingly supported as shown by springs 36. This plate is limited as to upward travel by the heads of the screws 37 (Fig. 2).

The apparatus as thus far disclosed and described is old and well known. In operation, a ribbon, strip or sheet 19 of material from which articles or blanks for articles to be cut by the action of the apparatus, is placed in position as shown in Fig. 1, resting on the common, flat, horizontal surface of the punch 21 and stripper plate 35. The ram 23 is then brought down by means (not shown) into the position of Figs. 2 and 3. In so doing, the article or article blank 18 is sheared peripherally from the stock 19 by the punch and die, and is forced up into the die by the punch which also forces the shedder 26 to retire upwardly within the die against the resilient resistance of the spring 34. As the die slides down partially over the punch to effect this shearing, the stripper plate 35 is driven yieldingly down against the resilient resistance of the springs 36. At the same time the central part of the article or blank 18 is sheared out by the coaction of the perforator 24 and the correspondingly bored punch. The waste bit of stock thus punched out falls down through the counterbored lower part 38 of the bore 25 of the punch, into a suitable receptacle (not shown). As the ram then rises again into the position of Fig. 1, carrying the die and perforator with it away from the punch, the stripper plate 35 and the shedder 26 are released to return under the restoring energies of their respective springs 36 and 34 to their position in Fig. 1. In so moving, the stripper plate forces the stock 19 up off the punch, and the shedder forces the article or article blank 18 down out of the die to fall and lie free on the stock, whence it is removed by any suitable means (not shown), or by shifting the stock 19 along for the next operation.

When the apparatus, as thus far described, is used to operate on stock which creates no dust in being sheared, e. g., on ordinary metallic materials, no difficulty of a serious nature occurs. But when the stock is of certain other materials, which are being more and more frequently formed of late by apparatus of the general character described, a very troublesome difficulty may be encountered. Other materials, e. g., compositions comprising artificial resins such as the phenol formaldehyde resins, or comprising ingredients such as casein plastic, cellulose ester plastic, rubber, isoprene, and the like, especially when compounded with pulverized solid fillers such as sawdust, carbon, metallic oxides, silica in various forms, mica, and the like, form more or less sometimes almost impalpably fine dust when sheared. This dust finds its way in between the interslidable surfaces of the punch and die, of the shedder and die, of the shedder and perforator, and of the punch and stripper plate. The matched surfaces of the punch and die, and of the punch and stripper plate are relatively accessible and easy to keep clean. But those between the die and shedder and between the shedder and perforator cannot be well gotten at unless the whole ram assembly be taken apart, a time-consuming operation. Furthermore, this dust from some materials may become more or less gummy and adhesive after a period of subjection to heat and pressure in the crevices of the machine. Thus in time an accumulation of the dust may build up to jam the shedder in the die or on the perforator or both. If the shedder jams in the position of Fig. 1, on the next stroke of the press the tools are subjected to excessive stress which may damage the tools, the press, or both. If the shedder jams in the position of Fig. 2, the punching 18 is not ejected from the die and if the ram be actuated again, the press may well be damaged. In any event, the presence of the usually abrasive dust on the intersliding surfaces may lead to serious damage to the tools.

To obviate the difficulty described, compressed air or other suitable fluid is led into the chamber 29 through a bore 39 in the wall of the die, fed through a flexible pipe 40 from any suitable source not shown. The air may be fed continuously; but this is wasteful and it is preferable to provide a valve 41 automatically actuated by an arm 42 on the ram of the press. As shown in Figs. 1, 2 and 3, the valve is actuated by the arm 42 to open at the bottom of the stroke of the ram; and thus air is supplied to the chamber 29 and thus to the crevices between the intersliding faces just after fresh dust has been created and just before the shedder moves down in the die facilitating the outward movement of the air through the crevices. In case the tools, especially the shedder and die, are large, it may be well also to provide diagonal passages 43 in the body of the shedder leading from the lower part of the chamber 29 to the lower part of the intersliding faces of the shedder and die.

In Figs. 4 and 5, the valve 41 is located above the arm 42, and thus is opened at the top of the ram stroke to fill the chamber 29 with air under pressure. When the ram begins to move down the valve closes and by the time the shedder begins to move up into the chamber 29, the air is completely sealed therein except for the crevices to be blown out. The intrusion of the shedder into the chamber 29 compresses the air therein powerfully, adding greatly to the effectiveness of the blast through the crevices.

While the description above speaks only of compressed air as the dust removing medium, instances may well occur in which other fluids may profitably be used alone or admixed with the air. Thus when the dust is particularly gummy an injector nozzle 44 in the pipe 40 may be used to admix a proportion of a liquid solvent, e. g., carbon tetrachloride, with the compressed air forced into the chamber 29.

Other modifications of and departures from the illustrative embodiments disclosed may be variously made without departing from the spirit and scope of the invention as pointed out in and limited only by the appended claims.

What is claimed is:

1. In an apparatus for forming articles or article blanks from dust producing materials by means of telescopically interfitting and interslidable members, means comprising the interslidable members to define a chamber closed except for the crevices between the interslidable faces of the members, and means to introduce a fluid into the chamber to be expelled through the said crevices to remove dust therefrom.

2. In an apparatus for forming articles or article blanks from dust producing materials by means of telescopically interfitting and interslidable members, means comprising the interslidable members to define a chamber closed except for the crevices between the interslidable faces of the members, and a compressed gas supply means to introduce gas under pressure to the chamber to be expelled therefrom through the said crevices and thereby to remove dust from the crevices.

3. In an apparatus for forming articles or article blanks from dust producing materials by means of telescopically interfitting and interslidable members, means comprising the interslidable members to define a chamber closed except for the crevices between the interslidable faces of the members, the said chamber being of greater volume in one position of the interslidable members and of less volume in another position thereof, and means to introduce a fluid into the chamber when of greater volume to be expelled therefrom by the contraction of the chamber to less volume and to be expelled thereby through the said crevices to remove dust therefrom.

4. In an apparatus for forming articles or article blanks from dust producing materials by means of telescopically interfitting and interslidable members, means comprising the interslidable members to define a chamber closed except for the crevices between the interslidable faces of the members, the said chamber being of greater volume in one position of the interslidable members and of less volume in another position thereof, and a compressed gas supply means to introduce gas under pressure into the chamber when of greater volume to be expelled therefrom by the contraction of the chamber to less volume and to be expelled thereby through the said crevices to remove dust therefrom.

BERIL EDELMAN.